3,652,552
Patented Mar. 28, 1972

3,652,552
PREPARATION OF LACTAMS FROM CYCLOALKANES

Johan W. Garritsen, Geleen, and Johannes H. A. Hofman, Maastricht, Netherlands, assignors to Stamicarbon N.V., Heerlen, Netherlands
No Drawing. Filed Dec. 18, 1967, Ser. No. 691,194
Claims priority, application Netherlands, Dec. 16, 1966, 6617753, 6617754
Int. Cl. C07d 29/16
U.S. Cl. 260—239.3     16 Claims

ABSTRACT OF THE DISCLOSURE

A process for producing lactams from cycloalkanes is disclosed. Cycloalkanes are reacted with nitrosyl chloride while subjected to irradiation, in the presence of a nitrile which does not contain any methylene groups capable of reacting with nitrosyl under the reaction conditions. $\omega$-Lactams are directly produced by heating the reaction product.

BACKGROUND OF THE PRIOR ART

The known photonitrosation process, generally involving the reaction of a cycloaliphatic hydrocarbon with a nitrosating agent, usually nitrosyl chloride, with simultaneous irradiation, produces a cycloalkanone oxime corresponding to the cycloaliphatic hydrocarbon. French patent specification 1,334,190 recommends that in this photochemical reaction with nitrosyl chloride, an excess amount of hydrochloride be added, whereby the oxime will be obtained as a liquid oxime hydrochloride, and undesirable further reactions with nitrosyl chloride are avoided.

French patent specification 1,335,822 discloses that the addition of sulphuric acid to the potonitrosation reaction mixture prevents the hindrance of irradiation due to deposits of oxime hydrochloride forming on the walls of the reaction vessel. According to this French patent, the oxime formed will be dissolved in a sulphuric acid, and thereafter the oxime in the resulting solution can be converted into a lactam by heating.

French patent specification 1,364,653 discloses that the formation of deposits of cyclododecanone oxime hydrochloride, which is difficult to obtain in a fully liquid form, can be avoided in the photonitrosation of cyclododecane, by photonitrosating the cyclododecane together with a cycloalkane of at most 8 carbon atoms, such as cyclohexane. Such a process facilitates the separation of the cyclododecanone oxime hydrochloride from the reaction mixture. The liquid mixture of oxime hydrochlorides, which is so obtained, may be easily separated from the reaction mixture.

SUMMARY OF THE INVENTION

The formation of undesirable deposits on the wall of a photonitrosation reaction vesesl, with the consequential hindrance of irradiation, is easily avoided, and $\omega$-lactams corresponding to the starting cycloalkanes are obtained as the reaction product, if nitrosyl chloride is reacted with a nitrile and a cycloalkane while subjected to simultaneous irradiation. The amount of nitrile utilized may be such that a single homogeneous phase is formed in the reaction mixture, or may be such that two oil phases are formed. The reaction product is heated to convert the same into the corresponding $\omega$-lactam.

DESCRIPTION OF THE INVENTION

Lactams are prepared from cycloalkanes by reacting the cycloalkanes with nitrosyl chloride and hydrogen chloride in a homogeneous liquid phase, with irradiation, at a temperature of −10 to 90° C. A nitrile which does not contain any —$CH_2$— groups (i.e., methylene groups) reacting with nitrosyl chloride in the molecule is dissolved in the cycloalkane. At least part of this nitrile is present as a nitrile/hydrogen chloride compound, and the nitrile concentration is maintained at at least 0.5 mole percent with respect to the cycloalkane. The reaction product when kept at a temperature of from 40 to 150° C. for at least 5 minutes, is converted into the corresponding $\omega$-lactam.

Under the reaction conditions the nitrile, which has been dissolved in the cycloalkane, reacts first with hydrogen chloride, so that at least a part of the nitrile is present as a nitrile/hydrogen chloride compound, which may be, for example, both the corresponding iminochloride and the hydrochloride thereof. The amount of nitrile which forms a compound with the hydrogen chloride depends upon the amount of hydrogen chloride present, and it is not necessary that all of the nitrile be converted into a nitrile/hydrogen chloride compound. A nitrile/hydrogen chloride compound will always be formed during the course of the reaction, even if no hydrogen chloride per se is added to the reaction mixture, since hydrogen chloride will be formed in situ in the photochemical reaction involving nitrosyl chloride.

The amount of hydrogen chloride added to the reaction mixture can be varied over quite wide limits. Preferably, at least 0.1 mole of hydrogen chloride will be added per mole of nitrile. Generally, the amount of hydrogen chloride added to the reaction mixture will not exceed about 20 moles of hydrogen chloride per mole of nitrile present in the reaction mixture, although larger excesses of hydrogen chloride may be used, if desired. The reaction mixture is conveniently maintained saturated with hydrochloride by passing a stream of gaseous hydrogen chloride into the reaction mixture during the photonitrosation reaction. The addition of small amounts of chlorine into the reaction mixture will generally promote a smoother reaction.

The reaction mixture will be stirred by the introduction of these gases, although to insure proper mixing of the reactants, a mechanical stirrer may also be utilized, as desired. It is also possible to add nitrosyl chloride in the gaseous form to the reaction mixture. The nitrosyl chloride may be formed in situ from NO and $Cl_2$.

In the known cycloalkane photonitrosation processes, the cycloalkanone oxime, or the hydrochloride thereof, is obtained as the reaction product. It is therefore surprising that in the photochemical process of the present invention, wherein the photonitrosation of cycloalkanes with nitrosyl chloride is conducted, the oximes or their hydrochlorides are not obtained as the reaction product. In the process of this invention, the nitrosyl chloride reacts with the cycloalkane and with the nitrile and/or the nitrile/hydrogen chloride compounds to form a cycloalkyl-imino-$\alpha$-imino-$\alpha$-alkyl ether from an aliphatic nitrile or a cycloalkyl-imino-$\alpha$-imino-$\alpha$-aryl ether from an aromatic nitrile. The resulting ether is bound as the hydrochloride by hydrogen chloride.

The molecules of the nitrile used in the process of this invention should not contain any —$CH_2$— groups capable of reacting with nitrosyl chloride under the reaction conditions. If such reactive —$CH_2$— groups are present, photonitrosation of the nitrile will occur, so that the desired photochemical reaction is hindered and the desired ether compound is not formed or is only formed to a minor extent. Generally, nitriles of the formula X—C≡N may be used, wherein X represents an aryl radical, a halogenated aryl radical, a methyl group or a halogenated alkyl radical of up to 6 carbon atoms wherein at least each carbon atom which is linked to two adjacent carbon atoms contains at least one halogen substituent. Preferred examples of the nitriles which can be used in the process of the present invention are benzonitrile, acetonitrile, dichloro-acetonitrile, trichloro-acetonitrile, chlorobenzonitrile and naphthonitrile and mixtures thereof. Chlorine is the preferred halogen, but other halogens, such as bromine, may be used.

The nitrosyl chloride will generally be added to the reaction mixture over the course of the reaction, in order to keep the amount of nitrosyl chloride present in the reaction mixture at a given time quite small. Preferably, the nitrosyl chloride concentration will be maintained at 0.5 to 2% by weight, based on the weight of the cycloalkane, although the nitrosyl chloride concentration may vary from about 0.1 to about 10% by weight.

Depending upon the concentration of the nitrile compound and the solvent, if a solvent is used, in the reaction mixture, the reaction may proceed in a homogeneous liquid phase or two oil phases may be formed. If a second oil phase is formed, it will contain not only the reaction product but also the nitrile. Some nitriles, such as, for instance, acetonitrile and chloro-acetonitrile, cannot be mixed with certain cycloalkanes in all ratios to form a homogeneous phase. In such cases, a second oil phase may be formed by undissolved nitrile in the cycloalkane prior to the photonitrosation reaction. The amount of nitrile compound present must be at least 0.5 mole percent, based on the moles of cycloalkane. At levels of the nitrile compound less than 0.5 mole percent, based on the moles of cycloalkane, the conversion will be too low for commercial requirements. If the amount of nitrile and/or nitrile/hydrogen chloride compound dissolved in cycloalkane is 0.5 to 25 mole percent of nitrile and/or nitrile/hydrogen chloride compound, based on the moles of cycloalkane, a two phase reaction product will be produced. With the nitrile compound maintained within these limits, the reaction product will generally have poor solubility in the reaction mixture, and will form a second oil phase. If amounts in excess of 25 mole percent, per mole of cycloalkane, of the nitrile compound are used, so much of the reaction product is dissolved in the reaction mixture that a separate oil phase of the reaction product either is not formed or else is formed in very small amounts, with the greater part of the reaction product remaining dissolved in the reaction mixture. If a homogeneous liquid phase is desired, the amount of nitrile compound utilized will preferably be at least 1 mole, per mole of nitrosyl chloride, and preferably the amount of nitrile compound will be within the range of 1 to 25 moles, per mole of nitrosyl chloride. It should be realized, however, that even greater amounts of nitrile compound may be used. The total amount of the nitrile compound and the solvent, when a solvent is used, may be sufficient to maintain a homogeneous liquid phase throughout the course of the reaction, so that the resulting reaction product is obtained in the form of a single phase reaction mixture solution. The maintenance of the proper concentration of nitrile compound in the reaction mixture is easily effected by proper control of reaction feed.

The use of solvents which are inert under the reaction conditions will promote the dissolving of the nitriles in the cycloalkanes. Among suitable solvents that can be mentioned are, by way of example, and not of limitation, benzene, ethers, chloroform, carbon tetrachloride, chlorobenzene and mixtures of these solvents. The use of solvents is particularly desirable when the cycloalkane, such as cyclododecane, is solid at normal temperatures. The formation of a solution of nitrile in the cycloalkane will be promoted by the use of such solvents. Although the amount of solvent present in the reaction mixture may vary considerably, and may be determined by the amount of nitrile present in the reaction mixture, generally amounts of solvent exceeding 50% by weight, based on the weight of the cycloalkane, will present the formation of the second oil phase, whereas amounts of solvent less than 50% by weight, based on the weight of the cycloalkane, will allow the second oil phase to form.

The reaction of nitrosyl chloride with the cycloalkane and the nitrile will be carried out at conventional reaction temperatures for nitrosating reactions with nitrosyl chloride, that is, at temperatures of −10 to 90° C.

The conventional sources of radiation that are commonly used to produce irradiation in photochemical reactions may be used, including gas discharge lamps, such as fluorescent lamps and mercury vapor lamps. Light of a greater wave length, for instance, sunlight, incandescent lamps and sodium lamps, may also be used. In order to prevent energy losses, it is possible to make the intensity of the irradiation dependent upon the supply of nitrosyl chloride or upon the intensity with which the reaction mixture is stirred.

In the case of a homogeneous liquid phase reaction mixture, the reaction product, an imino ether hydrochloride, may be readily separated from the reaction mixture in which it is dissolved by, for instance, evaporation and crystallization. The imino ether hydrochloride may then be converted into the ω-lactam corresponding to the starting cycloalkane by heating the imino ether hydrochloride at a temperature of 40 to 150° C., in the presence of hydrogen chloride. Preferably, a solvent is used in this heating step, which results in the conversion into the ω-lactam product. The conversion of the imino ether hydrochloride to the lactam may also be carried out in the solution in which the reaction product has been obtained. That is, it is not necessary to separate the intermediate imino ether hydrochloride from the photonitrosation reaction mixture.

In the case of the formation of a second oil phase in the reaction mixture, maintenance of this second oil phase at a temperature of 40 to 150° C., for at least 5 minutes, will convert the reaction product into the lactam corresponding to the starting cycloalkane. Prior to this second heating step conversion into the lactam, the oil phase may be separated from the reaction mixture by, for instance, decantation, and, if desired, mixed with a suitable solvent. Alternatively, the reaction product may be converted into the lactam while in the two-phase reaction mixture.

Since the photonitrosation reaction with nitrosyl chloride is carried out at a temperature of −10 to 90° C., it will be appreciated that conducting the reaction at a temperature of 40 to 90° C. is particularly preferred, as a second heating step in the reaction will not be required, as long as the reaction product is maintained at the reaction temperature of 40 to 90° C. for at least 5 minutes. If the photonitrosation reaction with nitrosyl chloride is conducted at a lower temperature, the reaction product is subsequently maintained at a temperature of from 40 to 150° C. for at least 5 minutes in order to promote the conversion to lactam. The reaction product may be maintained at this higher temperature for 10, 25 or 45 minutes, or even for several hours, as desired, although the conversion to lactam will generally be substantially complete after one hour.

In this second heating step-conversion of the imino ether hydrochloride reaction product into the lactam, a nitrile corresponding to the starting nitrile will be produced. In supplying nitrile into the reaction mixture, allowance should be made for the nitrile so formed in the second heating step of the reaction, as the nitrile and hydrogen chloride recovered from the second heating step may be recycled, as desired, to the reaction zone.

The separation of the lactam product from the reaction mixture may be easily done using conventional techniques, such as, for instance, distillation.

The cycloalkane is conveniently a cycloaliphatic hydrocarbon compound containing from 4 to 18 carbon atoms, and the corresponding ω-lactams will be produced therefrom. For instance, ε-caprolactam will be produced from cyclohexane, ω-caprylolactam will be produced from cyclooctane and ω-laurolactam will be produced from cyclododecane. Mixtures of cycloalkanes may be used as the starting material to produce mixtures of the corresponding ω-lactams.

The cycloalkyl-imino-α-imino-α-alkyl ethers and cycloalkyl-imino-α-amino-α-aryl ethers formed by the process of this invention are novel products, and are useful intermediates in the production of lactams. Upon heating, these ethers are readily converted into ω-lactams. These novel cycloalkyl-imino ethers will fall within the following generic formula:

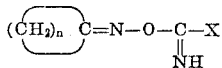

wherein $n$ is an integer of from 3 to 17 and X is an aryl radical, a halogenated aryl radical, a methyl group or a halogenated alkyl radical of up to 6 carbon atoms, wherein at least each carbon atom which is linked to two adjacent carbon atoms has at least one halogen substituent. Suitable examples of aryl groups represented by X include phenyl and naphthyl radicals. Particularly preferred cycloalkyl-imino ethers are those derived from cyclohexane, cyclooctane and cyclododecane, that is, when $n$ is 5, 7 or 11, and benzonitrile or acetonitrile. Particularly preferred ethers include cyclododecyl-imino-α-imino benzyl ether, of the formula:

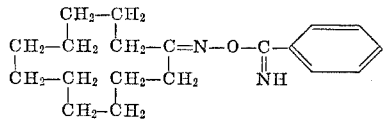

and cyclododecyl-imino-α-imino-ethyl ether, of the formula:

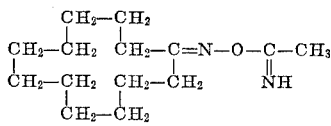

The invention will be understood more readily by reference to the following examples. However, these examples are intended to illustrate the invention and are not to be construed to limit the scope of the invention.

EXAMPLE 1

A 70-watt mercury vapor lamp provided with a cooling jacket is placed below the liquid level in a mixture of 1000 g. of cyclododecane, 200 g. of benzonitrile and 1000 g. of benzene.

Nitrosyl chloride is passed into the solution at the rate of 5 g. per hour, while the temperature is maintained at 30 to 35° C. with simultaneous irradiation. The solution is kept saturated with hydrogen chloride by continuously feeding in hydrogen chloride.

After a reaction time of 8 hours, the homogeneous reaction mixture is heated at a temperature of 80° C. for 15 minutes. Upon cooling to 25° C., a layer containing laurolactam hydrochloride and a hydrocarbon layer are formed. The layer containing laurolactam hydrochloride is separated off and extracted with cyclohexane, after which benzonitrile is recovered from the extract. The residual laurolactam hydrochloride is passed into water, laurolactam being formed as a solid and being separated by filtration.

In this way 65 g. of cyclododecane has been converted, from which 66 g. of ω-laurolactam (melting point 153° C.) has been obtained (yield 86%).

EXAMPLE 2

The experiment described in Example 1 is repeated. In this case the reaction mixture is cooled to 20 to 25° C. after a reaction time of 8 hours, after which a flow of nitrogen is passed through the homogeneous solution, as a result of which hydrogen chloride is recovered. This produces two layers, hydrocarbon layer and a layer containing benzonitrile and the resulting cyclododecyl-imino-α-imino-benzyl ether hydrochloride.

This ether hydrochloride layer is separated off and heated at a temperature of 80° C. for 15 minutes. Subsequently, benzonitrile is recovered by extraction with cyclohexane.

The residual laurolactam hydrochloride is hydrolyzed with water, as described in Example 1. The result is the same as that obtained according to Example 1.

When repeating this experiment with the difference that, instead of nitrosyl chloride, now 3.8 l. of NO and 1.7 l. of Cl₂ are hourly passed into the solution, after 8 hours 41 g. of cyclododecane are converted and 30.3 g. of ω-laurolactam are obtained (yield 63%).

EXAMPLE 3

In a similar way to that described in Example 1, a homogeneous mixture of 1000 g. of cyclohexane, 1000 g. of benzene, and 500 g. of benzonitrile is made to react with nitrosyl chloride. The nitrosyl chloride is added at the rate of 8 g. per hour, while the reaction temperature is kept at 20 to 25° C.

After a reaction time of 10 hours, the homogeneous reaction mixture is heated at a temperature of 70° C. for 45 minutes. Upon cooling to 20° C., a hydrocarbon layer and a layer containing the reaction product are formed. The layer containing caprolactam hydrochloride is separated off and extracted with cyclohexane (recovery of benzonitrile) and then passed into water and neutralized with ammonia. Upon extraction with chloroform and upon removal of this solvent, ε-caprolactam is obtained.

In this way, 67 g. of cyclohexane has been converted, from which 54 g. of ε-caprolactam (melting point 68° C.) has been obtained (yield 60%).

EXAMPLE 4

(A) In a similar way to that described in Example 1, a mixture of 220 g. of cyclododecane, 15 g. of acetonitrile and 80 g. of benzene is made to react with nitrosyl chloride. The nitrosyl chloride is added at the rate of 2 g. per hour, while the reaction temperature is kept at 30 to 35° C.

During the reaction, cyclododecyl-imino-α-imino-ethyl ether hydrochloride separates as a solid from the homogeneous liquid. After a reaction time of 2½ hours, the resulting solid substance is separated by filtration and washed with cyclohexane.

The amount of solid substance obtained is 14 g. (melting point 136° C.). This substance has been identified by analysis as the hydrochloride of cyclododecyl-imino-α-imino-ethyl ether.

(B) In a similar way to that described in Example 1, a mixture of 220 g. of cyclododecane, 15 g. of acetonitrile, 100 g. of benzene and 100 g. of chloroform is made to react with nitrosyl chloride. The nitrosyl chloride is added at the rate of 4 g. per hour and the reaction temperature is kept at 30 to 35° C. After a reaction time of 3 hours, the homogeneous reaction mixture is heated at a temperature of 65° C. for 30 minutes. Subsequently, chloroform and acetonitrile are separated off by distillation, when also part of the benzene is recovered. Upon cooling the reaction mixture to 200° C., a hydrocarbon layer and a laurolactam hydrochloride layer are formed. The laurolactam hydrochloride is passed into water and the resulting laurolactam is recovered by distillation.

In this way 26 g. of cyclododecane has been converted, from which 27 g. of ω-laurolactam (melting point 153° C.) has been obtained (yield 88%).

EXAMPLE 5

A 70-watt mercury vapor lamp provided with a cooling jacket was placed below the liquid level in a stirred reaction vessel containing a mixture of 500 g. cyclododecane, 30 g. benzonitrile and 180 g. benzene.

Nitrosyl chloride was passed into the mixture at the rate of 4 g. per hour, while the temperature was maintained at 30 to 35° C., with simultaneous irradiation from the lamp. The mixture was kept saturated with hydrogen chloride by continuously feeding in hydrogen chloride.

In the stirred reaction mixture, a second phase was formed, which slowly separated from the mixture as a liquid layer and was continuously discharged.

The amount of liquid in the reaction vessel was kept constant and the benzonitrile concentration was maintained at 5 to 6% by weight, with respect to the cyclododecane, by adding cyclododecane and benzonitrile.

The discharged second phase was mixed with an equal volume of acetonitrile and was boiled for 15 minutes with reflux cooling. The mixture was then subjected to a distillation, and acetonitrile and benzonitrile were recovered overhead and crude ω-laurolactam hydrochloride was obtained as the residue. The residue was washed with cyclohexane to remove adhering cyclododecane and subsequently was stirred in water, which caused the hydrochloride to hydrolyze, and the ω-laurolactam was then separated off by filtration. After washing with hot water, the product was dissolved in benzene and pure ω-laurolactam was thereafter obtained by crystallization.

After a reaction time of 50 hours, 358 g. of cyclododecane was converted and 390 g. of ω-laurolactam (melting point 153° C.) was obtained (yield 93%).

EXAMPLE 6

The experiment of Example 5 was repeated with the difference that, instead of nitrosyl chloride, 3 l. of NO per hour and 1.35 l. of $Cl_2$ per hour were passed into the mixture.

After a reaction time of 25 hours, 128 g. of cyclododecane was converted and 133.6 g. of laurolactam was obtained (yield 89%).

EXAMPLE 7

In a similar way to that described in Example 5, a mixture of 250 g. cyclododecane, 250 g. cyclohexane and 30 g. benzonitrile, is reacted with nitrosyl chloride, with the reaction temperature kept at 25 to 30° C. Cyclododecane and cyclohexane (weight ratio 2:1) are added to the reaction as the cycloalkane component.

The distillation residue left after removal of benzene and benzonitrile was washed with cyclohexane and then stirred in water, when the hydrochloride of laurolactam was hydrolyzed. The resulting ω-laurolactam was separated off by filtration. The residual solution was neutralized with ammonia and extracted with chloroform. ε-caprolactam was recovered from the chloroform solution.

After a reaction time of 20 hours, 72 g. of cyclododecane and 36 g. of cyclohexane were converted, from which 76.8 g. of ω-laurolactam (melting point 153° C.) and 30 g. of ε-caprolactam (melting point 68° C.) were obtained (yield 91% and 62%, respectively).

EXAMPLE 8

In a similar way to that described in Example 5, a mixture of 500 g. cyclohexane and 30 g. benzonitrile, was reacted with nitrosyl chloride. The nitrosyl chloride was added at the rate of 6 g. per hour, while the reaction temperature was kept at 20 to 25° C.

The discharged second phase was mixed with an equal volume of acetonitrile and heated at 75° C. for 50 minutes. Acetonitrile and benzonitrile were recovered by distillation, the residue was transferred to water and neutralized with sodium hydroxide. Upon extraction with chloroform and upon removal of this solvent, ε-caprolactam and, as a byproduct, bis-ε-caprolactim ether, were obtained.

After a reaction time of 10 hours, 51 g. of cyclohexane was converted, from which 42 g. of ε-caprolactam (melting point 68° C.) was obtained (yield 61.2%). 18 g. of bis-ε-caprolactim ether was recovered as a byproduct.

EXAMPLE 9

The experiment described in Example 8 was repeated with the difference that cyclooctane (500 g.) was used as the starting product, nitrosyl chloride was fed in at the rate of 5 g. per hour, the reaction temperature was maintained at 25 to 30° C. and the neutralization was carried out with ammonia.

After a reaction time of 24 hours, 134 g. of cyclooctane was converted, from which 121.5 g. of ω-caprylolactam (melting point 73° C.) was obtained (yield 72%).

EXAMPLE 10

A 70-watt mercury vapor lamp provided with a cooling jacket is placed in a reaction vessel. Cyclohexane (600 g.) was circulated through the reaction vessel and through an extraction vessel, which initially contained acetonitrile (100 g.).

Nitrosyl chloride was fed into the reaction vessel at a rate of 5 g. per hour, while the temperature was maintained at 20° C. with simultaneous irradiation. The mixture in the reaction vessel was kept saturated with hydrogen chloride by continuously feeding in hydrogen chloride.

After 10 hours, the acetonitrile layer was removed from the extraction vessel and heated at 75° C. for 20 minutes. Subsequently, acetonitrile was recovered by distillation, whereupon the residue was stirred in water and the resulting aqueous mixture then neutralized with sodium hydroxide. ε-Caprolactam was recovered by extraction of the neutralized product with chloroform and evaporation of that solvent.

In this experiment, 48 g. of cyclohexane were converted and 40.7 g. of ε-caprolactam (yield 63%) were obtained. A small amount of bis-ε-caprolactim ether was obtained as a byproduct.

EXAMPLE 11

The experiment described in Example 5 (cyclododecane) is repeated with the difference that no benzene was used, the reaction temperature was kept at 70 to 80° C. and the rate at which nitrosyl chloride was fed in was 6 g. per hour.

The reaction product was procesed in a different way. The discharged second phase was extracted with cyclohexane to remove and recover benzonitrile and the residual product was mixed wtih an equal volume of xylene and the mixture then boiled for 1 hour with reflux cooling, while a flow of nitrogen was passed through. In this way, hydrogen chloride was recovered, after which ω-laurolactam was obtained by evaporation and crystallization.

After a reaction time of 6 hours, 48 g. of cyclododecane was converted, from which 34 g. of ω-laurolactam (melting point 153° C.) was obtained (yield 60.2%).

EXAMPLE 12

In a similar way to that described in Example 9, nitrosyl chloride was passed into a mixture of cyclooctane (500 g.), acetonitrile (25 g.) and benzene (80 g.).

The discharged second phase was dissolved in an equal volume of acetonitrile and the mixture was boiled for 1 hour with reflux cooling. The mixture was then distilled and the lactam was recovered from the residue in the same way as described in Example 9.

After a reaction time of 5 hours, 28 g. of cyclooctane was converted, from which 25.7 g. of ω-caprylolactam (melting point 73° C.) was obtained (yield 73%).

Obviously, many modifications and variations of the present invention are possible in the light of the above teachings. It is, therefore, to be understood that within the scope of the appended claims, the invention may be practiced otherwise than as specifically described.

What is claimed is:
1. In a process for preparing lactams from cycloalkanes comprising reacting at least one cycloalkane with nitrosyl chloride and hydrogen chloride, with simultaneous irradiation, at a temperature of −10 to 90° C., the improvement comprising conducting said reaction in the presence of at least 0.5 mole percent, based on the moles of cycloalkane, of at least one nitrile which does not contain any —$CH_2$— groups reacting with nitrosyl chloride in the molecule thereof, at least a part of the said nitrile present as at least one nitrile/hydrogen chloride compound, and maintaining the resulting reaction product at a temperature of about 40 to 150° C. for at least 5 minutes, whereby at least one ω-lactam is produced.

2. The process as claimed in claim 1 wherein said nitrosyl chloride is formed in situ from NO and $Cl_2$.

3. The process as claimed in claim 1 wherein said nitrile has the formula X—C≡N, wherein X is selected from the group consisting of aryl, halogenated aryl, methyl and halogenated alkane of up to 6 carbon atoms, in which alkane at least each carbon atom which is linked to two adjacent carbon atoms has at least one halogen substituent.

4. The process as claimed in claim 3, wherein said nitriles are selected from the group consisting of benzonitrile, acetonitrile, dichloro-acetonitrile, trichloro-acetonitrile, chlorobenzonitrile, naphthonitrile and mixtures thereof.

5. A process as claimed in claim 1 wherein the nitrosyl chloride concentration is maintained at about 0.5 to 2 percent by weight, based on the weight of the cycloalkane, and from about 0.1 to about 20 moles of hydrogen chloride, per mole of nitrile, is present in the reaction mixture.

6. The process as claimed in claim 1, wherein said reaction is conducted in the presence of at least one mole, per mole of nitrosyl chloride, of said nitrile, whereby the resulting reaction product is essentially contained in a homogeneous liquid phase.

7. The process as claimed in claim 6, wherein the reaction is conducted in the presence of an effective amount of an inert solvent, whereby the homogeneous liquid phase is preserved.

8. The process as claimed in claim 6, wherein the reaction is conducted at a temperature within the range of 40 to 90° C.

9. The process as claimed in claim 8, wherein the homogeneous liquid phase is maintained at about the reaction temperature of 40 to 90° C., for at least 5 minutes after the completion of the reaction, to produce the desired ω-lactam product.

10. The process as claimed in claim 6, wherein from 1 to about 25 moles of nitrile, per mole of nitrosyl chloride, is present during said reaction.

11. The process as claimed in claim 1, wherein said reaction is conducted in the presence of about 0.5 to 25 mole percent, based on the moles of said cycloalkane, of said nitrile, whereby a second oil phase containing the reaction product is formed in the reaction mixture during the course of the reaction.

12. The process as claimed in claim 11, wherein the reaction is conducted in the presence of less than 50 percent by weight, based on the weight of said cycloalkane, of an inert solvent, whereby solution of said nitrile in the reaction mixture is promoted.

13. The process as claimed in claim 11, wherein the reaction is conducted at a temperature within the range of 40 to 90° C.

14. The process as claimed in claim 13, wherein the said second oil phase is maintained at the reaction temperature of 40 to 90° C., for at least 5 minutes, to produce the desired ω-lactam product.

15. The process claimed in claim 11, wherein the second oil phase containing the reaction product is separated from the reaction mixture and thereafter is maintained at a temperature of 40 to 150° C. for at least 5 minutes to convert the reaction product into at least one ω-lactam.

16. The process as claimed in claim 15, wherein a nitrile corresponding to the starting nitrile is recovered from the conversion of the reaction product into said ω-lactam, and the said nitrile so recovered is recycled to the reaction.

References Cited
UNITED STATES PATENTS

| | | | |
|---|---|---|---|
| 3,062,812 | 11/1962 | Taylor | 260—239.3 |
| 3,090,739 | 5/1963 | Ito | 260—239.3 |
| 3,297,684 | 1/1967 | Ito et al. | 260—239.3 |
| 3,437,655 | 4/1969 | Garritsen et al. | 260—239.3 |

HENRY R. JILES, Primary Examiner

R. T. BOND, Assistant Examiner

U.S. Cl. X.R.

204—158 R, 162 XN; 260—294.7 F, 326.5 FN, 566 AE